W. J. BEATTIE
METHOD OF MANUFACTURING SOFT COLLARS AND PRODUCT THEREOF
Feb. 7, 1933. Original Filed Aug. 11, 1930 Re. 18,732
Fig. 1.
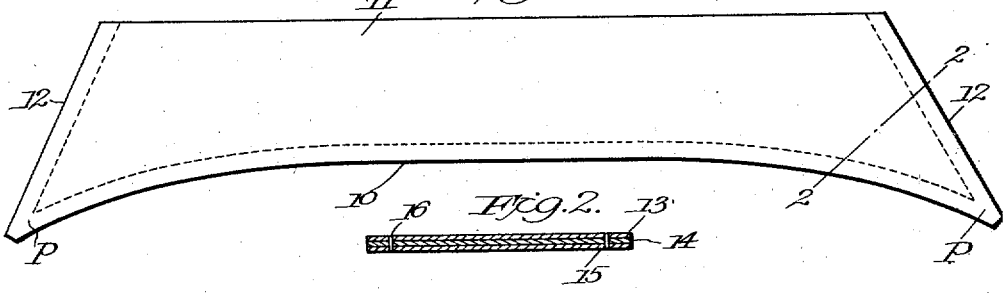
Fig. 2.
Fig. 3.
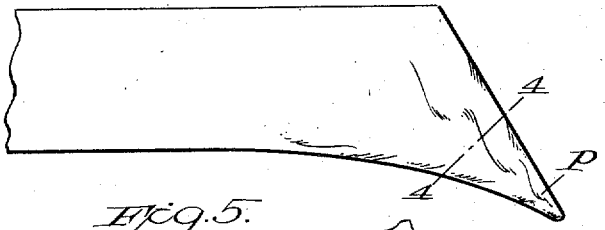
Fig. 4.
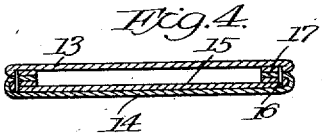
Fig. 6.
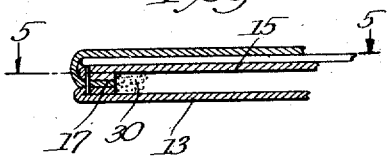
Fig. 5.
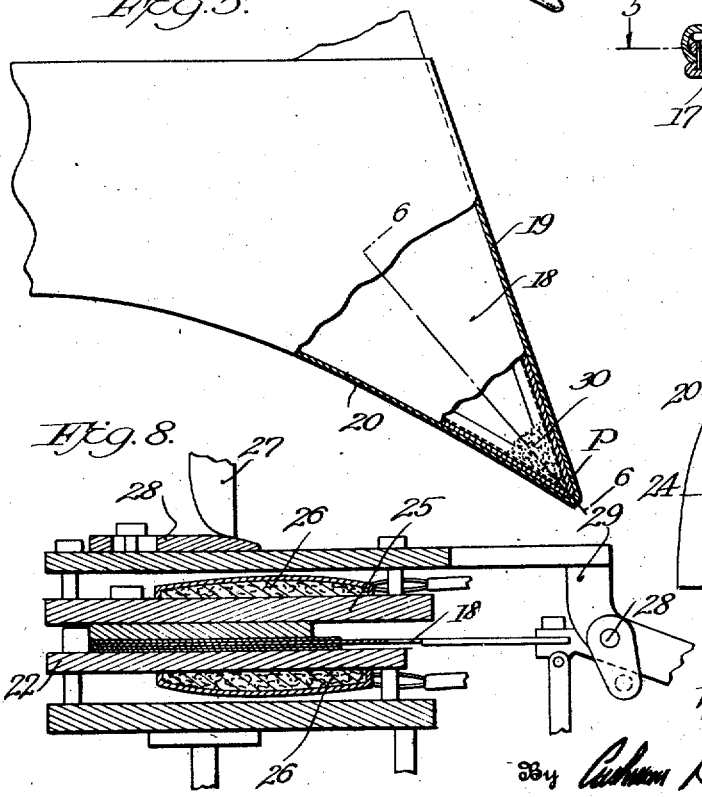
Fig. 7.
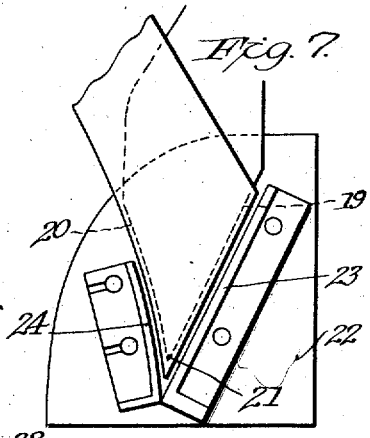
Fig. 8.
Inventor
Walter J. Beattie.
By Cushman Darby & Cushman
Attorneys Reissued Feb. 7, 1933

Re. 18,732

UNITED STATES PATENT OFFICE

WALTER J. BEATTIE, OF COHOES, NEW YORK, ASSIGNOR TO THE BEATTIE MANUFACTURING CO., OF COHOES, NEW YORK, A CORPORATION OF NEW YORK

METHOD OF MANUFACTURING SOFT COLLARS AND PRODUCT THEREOF

Original No. 1,795,704, dated March 10, 1931, Serial No. 474,589, filed August 11, 1930. Application for reissue filed June 23, 1931. Serial No. 546,398.

The present invention relates to the manufacture of collars of the type having a fold-over top comprising a plurality of plies.

Collars of the soft or semi-soft type having multiple ply fold-over tops may be conveniently divided into two distinct classes from the standpoint of the method employed in manufacture. The first class may be identified as the machine-turned collar, and the second class the hand-turned collar.

In the manufacture of the machine-turned collar the facing plies of the top are folded along their edges, and are disposed in registry with one another with the edges inturned and facing; an interliner is ordinarily disposed between the plies and the collar is then stitched by a single marginal line of stitching. Subsequent operations do not change this relation of the several plies.

In the manufacture of the hand-turned collar, the same three plies are superimposed in registry with one another, the two facing plies being arranged together, and the interliner initially forming a third and outer ply. The three plies are then stitched together by a marginal line of stitching which extends along one longitudinal edge and the two transverse edges. Where the longitudinal and transverse lines of stitching meet, the collar points are formed. The collar is then turned inside out, ordinarily by a manual operation, with the result that the interliner is disposed between the two facing plies and edges of all three plies are inturned, thereby concealing the stitching. Thereafter a second marginal line of exposed stitching is run paralleling the concealed longitudinal and transverse lines of stitching, thus forming a completed top which is ready for attachment to the band.

The present invention relates primarily to this second class of collars which involves the turning operation after the three plies are stitched together.

Although by far the greater portion of collars now manufactured are of the hand-turned type, a serious objection to this type of collar has been the lack of uniformity in the shape of the collar points formed where the longitudinal and transverse lines of stitching meet. By "point", I mean not merely the exact juncture of the transverse and circumferential edges, but also the area between and along these edges adjacent their juncture. Since these lines of stitching are spaced somewhat from the edges of the plies, the subsequent inturning operation provides a surplus of material at the points, thus rendering the same objectionably bulky. Moreover, since the arrangement of the surplus material at these points has been dependent upon the uniformity in width of the material between the line of stitching and the edge, and the accuracy of the operator in turning the collar, this surplus material is not uniformly distributed in points of different collars or even in the points of the same collar. Consequently, the subsequent pressing operation does not provide points which are uniformly shaped, due to the fact that the points are not given and held to predetermined contour before the pressure and heat are applied.

Since the points of the fold-over top are the most conspicuous portions of a collar, they are the portions of the collar to which those experienced in the trade primarily direct their attention in determining quality and salability of the article.

An object of the present invention is to provide an improved method for the manufacture of collars which will uniformly distribute the excess or bulking material at the collar points and produce points of predetermined and uniform shape.

A further object of the invention is to provide means for retaining the shape produced by this method even after laundering operations which are necessary after the collar has become soiled.

Although the method may be practiced entirely by manual operations, I prefer to employ in connection with certain steps a machine of the character disclosed in my copending application, Serial No. 474,590, filed August 11, 1930.

The invention also relates to the collar produced by the method and an object is to provide a collar having uniform or matched points of predetermined shape which will be retained substantially throughout the life of the collar.

In the accompanying drawing which illustrates certain steps in the method,

Figure 1 is a plan view showing the several top plies cut and stitched together along one longitudinal edge and the two transverse edges of the top.

Figure 2 is a cross sectional view on the line 2—2 of Figure 1.

Figure 3 is a fragmentary plan view showing the collar after it has been turned.

Figure 4 is a cross sectional view on the line 4—4 of Figure 3.

Figure 5 is a fragmentary view showing the former die inserted and with a part of the same together with portions of the top ply and interliner broken away on the line 5—5 of Figure 6.

Figure 6 is a sectional view on substantially the line 6—6 of Figure 5.

Figure 7 is a plan view illustrating a portion of the step employed in shaping the points.

Figure 8 is a fragmentary view showing a means for pressing and shaping the point.

The top (Fig. 1) is of conventional outline, having longitudinal or circumferentially extending edges 10, 11, transverse edges 12 and points P, the longitudinal edge 10 being the free or lower edge and the edge 11 the part which is ordinarily inserted in and stitched to the band.

The top is formed by a plurality of plies which, after being cut, are superimposed with their edges registering. These plies are stitched together in the relation shown in Figure 2, so that the two outer plies 13, 14 are disposed face to face and the interliner 15 is exposed. The stitching 16 parallels the free edge 10 and the two transverse edges 12 and is slightly spaced from these edges.

The top is then turned inside out, ordinarily by a manual operation, so that the plies assume the relation shown in Figures 3 and 4, namely with the interliner 15 disposed between the two facing plies 13, 14 and with the stitching and free edges 17 of all the plies inturned at one side of the interliner and concealed.

This turning operation forms at the points P a surplus of material which heretofore it has been customary simply to flatten in a pressing operation. It has been impossible to produce by this procedure points which are of definitely predetermined shape and absolutely matched or uniform. The simple turning operation heretofore employed leaves the surplus or bulking material to arrange itself within the points and a mere pressing of these points does not change the position of or distribute this material, but merely flattens the points and compresses the material. Aside from the necessity for positively arranging the material within the points in a uniform manner, the other variable factors entering into the production of the points make it more difficult to match the same or obtain a uniform shaping. These factors being the variation in the area of the fabric between the lines of stitching and the edges of the plies and the variation of the turning or infolding of the edges in the hand-turning operation.

For the purpose of producing points in which the surplus material is properly distributed, which are of predetermined and uniform shape or contour and which will retain this shape at least until the collar is laundered, I propose to internally distribute this material and internally shape or give contour to the points. For this purpose I may insert within each point after the collar has been turned (Fig. 3) a former die 18 having edges 19, 20 and a sharp point 21, which will fit into the point P of the collar. This die is preferably of thin flexible construction (Fig. 8) and is inserted at the side of the interliner opposite that which faces the inturned edge 17. The collar point and die are then disposed in a recess or external die which may be positioned upon a bed 22 and has upstanding walls 23, 24 paralleling the edges 19, 20 of the die 18.

With the two dies thus interfitted, the walls of the outer die and the edges of the inner die are relatively advanced for the purpose of exerting external shaping pressure against the edges (transverse and circumferential) of the collar at its point area, thereby shaping the collar point. Although I refer to the abutting relation of the external die walls with the edges of the collar as effecting an external pressure, it will be understood, of course, that by "pressure" I mean simply an abutting relation which produces the shaping desired, it being immaterial whether the shaping effect be considered as produced by movement of the inner die or by movement of the outer dies toward the inner die. This relative movement of the dies will impart a definite and predetermined shape to the collar. The surplus material formed by the turning operation and which bulks the collar point, is distributed by the operator when inserting the die 18 and also by the relative movement of the dies, since the frictional engagement of the under surface of the collar with the top surface of the bed 22 as the dies are relatively moved will tend to advance the inner die 18 toward the point of the collar and effect a proper distribution of the excess material. This movement of the die into the collar will result in the desired contour or shape which is imparted to the point by the two converging edges of the die which follow, respectively, the transverse and circumferential edges of the collar point.

The method also contemplates the application of heat and pressure to the surfaces of the collar point, while it is being shaped, as described.

Although this pressing may be applied by hand, in Figure 8, there is shown a portion of an apparatus described in my copending application, above identified, and in this application there is shown only so much of the same as is necessary to explain clearly the pressing and shaping operation.

As will be observed, the die 18 is disposed directly above the bed 22 and beneath a head 25. The head and bed are provided with electrical heating means 26 and the collar point disposed on the die 18 between the head and bed is pressed by means of upward movement of the bed 22, this upward movement being opposed by the head which is held in the horizontal position by means of an arm 27 supported in any suitable manner (not shown) and engaging a block 28 on the top surface of the head. Upon release of upward pressure against the bed, the latter may be lowered and by moving the arm 27 from the position shown in Figure 8, the head may be permitted to rise by rocking movement of the shaft 28 which forms a pivotal mounting for the head and to which it is secured by the depending arm 29. Further description of this mechanism is thought unnecessary in view of the fact that it constitutes no part of the present invention and is referred to in this application merely for the purpose of explaining a suitable mechanism for heating and pressing the collar, while it is being shaped by the internal and external dies.

It has been found that collar points shaped in the manner described will be matched and will retain this shape until laundering.

It is possible to retain this shape after the repeated laundering operations which are necessary throughout the life of the collar by applying, during the manufacturing operation and also preferably before the shaping and pressing step, a waterproof stiffening material. This material is inserted between the plies at the point of the collar and at the side of the interliner which faces the inturned edges 17. The inturned edges form at the points a space suitable for receiving this material, since they separate the facing ply 13 and the interliner. Moreover, the material will serve to adhesively unite or integrate the several inturned edges and the interliner.

For accomplishing this result, I may employ a cellulose ester in a volatile solvent. For example, cellulose acetate dissolved in acetone or other suitable volatile solvent is a suitable material, since it will remain substantially unchanged through repeated laundering operations. Cellulose binding materials of this character are insoluble in water and will adhere to the fabric in the form of a flexible and washable stiffening layer. The coating inserted in the collar should be of a character which will penetrate the fabric to a certain degree without appearing on the external surface of the outer ply, so that the outside of the latter will have its normal appearance.

Instead of employing materials of this character, I may use merely gum arabic which may be applied in either powdered form or as a paste.

Such materials may be inserted in the collar in any suitable manner, but should reach the point P. Referring to Figures 5 and 6, the area at the point P is illustrated as containing a stiffening material 30 located between the interliner 15 and the outer ply 13 immediately adjacent the inturned edges 17. After the material has been inserted and the die 18 has been disposed in the collar at the opposite side of the interliner, the collar may be subjected to the shaping and heating steps. The die 18 is maintained in the collar and within the external die until the material has hardened sufficiently to retain the shape imparted by the dies; preferably the heat and pressure is also continued unless the stiffening material used is of a character which will not harden while the heat is maintained. In this event the heat is cut off and merely the pressure continued until the material has hardened sufficiently. Since ordinarily on laundering operations will tend to modify the shape, it will be found that the collar may be quickly removed from the dies and the stiffening material allowed to harden without continuing the shaping and pressing steps until the material hardens.

Obviously, numerous variations of the method described may be resorted to without departing from the invention, the essential characteristics of which are set forth in the accompanying claims.

I claim:

1. In the manufacture of soft collars of the fold-over multiple, stitched-ply type, the improvement which consists in impregnating with a stiffening material the points of the fold-over top, and interiorly shaping the stitched points before the stiffening material has hardened and while applying heat and pressure.

2. In the manufacture of soft collars of the fold-over type, the improvement which consists in impregnating with a stiffening material the points of the fold-over top, interiorly shaping the points and while the latter are being shaped applying heat and external pressure to said points.

3. In the manufacture of soft collars of the type having multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally shaping the points and while the latter are being shaped applying heat and external pressure to said points.

4. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally shaping the points, while the points are being shaped applying heat and external pressure to the points, and thereafter running a second line of exposed stitching along said longitudinal and transverse edges.

5. In the manufacture of soft collars of the type having a multiple ply fold-over top, the improvement which consists in superimposing the several plies forming the top, stitching the same together along one longitudinal and two transverse edges while having free the other longitudinal edge which is to be secured to the band, turning the top inside out thereby inturning the stitched edges and concealing the stitching, impregnating the points with a stiffening material and interiorly shaping the points while said material is not hardened.

6. In the manufacture of soft collars of the type having a multiple ply fold-over top, the improvement which consists in superimposing the several plies forming the top, stitching the same together along one longitudinal and two transverse edges while leaving free the other longitudinal edge which is to be secured to the band, turning the top inside out thereby inturning the stitched edges and concealing the stitching, impregnating with a waterproof stiffening material the areas where the transverse and longitudinal lines of stitching meet and interiorly shaping the points while said material is not hardened, and while the latter are being shaped applying heat and external pressure to the points.

7. In the manufacture of soft collars of the fold-over multiple, stitched-ply type, the improvement which consists in impregnating with a water resistant stiffening material the points of the fold-over top, and interiorly shaping the points before the stiffening material has hardened.

8. In the manufacture of soft collars of the type having a multiple ply fold-over top, the improvements which consists in superimposing the several plies forming the top, stitching the same together along one longitudinal and two transverse edges while leaving free the other longitudinal edge which is to be secured to the band, turning the top inside out thereby inturning the stitched edges and concealing the stitching, impregnating with a stiffening material the areas where the transverse longitudinal lines of stitching meet, interiorly shaping the points while said material is not hardened, and thereafter running a second line of stitching along said stitched edges.

9. In the manufacture of soft collars of the fold-over type, the improvement which consists in impregnating with a stiffening material the points of the fold-over top by internally shaping the points and while the latter are being shaped applying heat and external pressure, the pressure being applied against both the surfaces and edges of the collar.

10. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally shaping the points and while the latter are being shaped applying heat and pressure, the pressure being applied against the surfaces and edges of the collar.

11. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally shaping the points and while the latter are being shaped applying heat and pressure, the pressure being applied against the surfaces and edges of the collar, and thereafter running a second line of exposed stitching along said longitudinal and transverse edges.

12. In the manufacture of soft collars of the type having a multiple ply fold-over top, the improvement which consists in superimposing the several plies forming the top, stitching the same together along one longitudinal and two transverse edges while leaving free the other longitudinal edge which is to be secured to the band, turning the top inside out thereby inturning the stitched edges and concealing the stitching, impregnating with a stiffening material the areas where the transverse and longitudinal lines of stitching meet, while said material is not hardened internally shaping the points and while the latter are being shaped applying heat and external pressure, the pressure being applied against both the surfaces and edges of the collar.

13. In the manufacture of soft collars of the type having a multiple ply fold-over top, the improvement which consists in superimposing the several plies forming the top, stitching the same together along one longitudinal and two transverse edges, turning the top inside out, thereby inturning the stitched edges and concealing the stitching, interiorly shaping the points including the adjacent longitudinal and transverse edges and while shaping the same applying heat to the points and exerting an external pressure against said adjacent longitudinal and transverse edges.

14. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally and externally shaping the points by exerting a rigid confining pressure along the edges at the points between rigid surfaces arranged internally and externally of the points and while the latter are confined to desired shape applying heat and external pressure to said points.

15. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching internally shaping the points, shaping the points by externally confining the edges of the collar at the points, and while the latter are confined to shape applying heat and external pressure to said points.

16. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally shaping the points, externally confining the points and while the points are externally confined to desired shape applying heat and external pressure to the points, and thereafter running a second line of exposed stitching along said longitudinal and transverse edges.

17. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally shaping the points, externally shaping the points and while the latter are being shaped applying heat and pressure, the pressure being applied against the surfaces and edges of the collar, and thereafter running a second line of exposed stitching along said longitudinal and transverse edges.

18. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally shaping the points, shaping the points by externally confining the edges and while the latter are being shaped applying heat and pressure, the pressure being applied against the surfaces, and thereafter running a second line of exposed stitching along said longitudinal and transverse edges.

19. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally shaping the points, shaping the points by confining the edges externally and internally and while the latter are being shaped applying heat and pressure, the pressure being applied against the surfaces, and thereafter running a second line of exposed stitching along said longitudinal and transverse edges.

20. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, internally shaping the points, shaping the points by externally confining the edges and while the latter are confined to shape applying heat and pressure, the pressure being applied against the surfaces.

21. In the manufacture of soft collars of the fold-over type, the improvement which consists in stitching together the several plies forming the top, turning the top inside out and thereafter shaping the points by externally and internally confining the edges and while the latter are being shaped applying heat and external pressure.

22. In the manufacture of soft collars of the type having a fold-over top, the improved method which consists in internally and externally applying pressure against and confining to a predetermined shape the edges at the point of a preformed collar, and while so confined applying heat and pressure to the collar point within the confined area.

23. The method of shaping the points of a textile product such as a collar or cuff, comprising cloth plies edge-turned, said method comprising compressing the points between substantially parallel surfaces arranged internally and externally of the points, and holding the turned edges firmly against surfaces arranged internally and externally of the points and disposed transversely of said parallel surfaces to form the desired edge contour during the compression.

24. The method of shaping the points of a textile product, such as a collar or cuff, comprising cloth plies edge-turned, said method comprising compressing the points between substantially parallel surfaces arranged internally and externally of the points, applying heat to the points during the compression, and holding the turned edges to the desired contour during the compression by confining the same under pressure between surfaces arranged internally and externally of the points.

25. The method of shaping the points of a textile product such as a collar or cuff comprising cloth plies edge-turned, which method comprises compressing the points between substantially parallel surfaces arranged internally and externally of the points to condense the points and forcing the edges thereof against surfaces arranged internally and externally of the points and substantially normal to the parallel surfaces and delineating the contour each point is to assume.

26. The method of shaping the points of a textile product such as a collar or cuff comprising cloth plies edge-turned, which method comprises impacting and compressing the points between substantially parallel surfaces arranged internally and externally of the points to condense the edge-turned portions of the points, restraining the turned edges between rigid surfaces arranged internally and externally of the points to a well defined contour during impacting and compressing thereof for shaping these edges, and applying heat during these operations to cause the edges permanently to assume the desired contour.

27. In the manufacture of soft collars of the type having a multiple ply fold-over top, the improvement which consists in superimposing the several plies forming the top, stitching the same together along one longitudinal and the transverse edges while leaving open the other longitudinal edge which is to be secured to the band, turning the top inside out, thereby inturning the stitched edges and concealing the stitching, and internally and externally shaping the points and while the latter are being shaped applying heat and pressure, the pressure being applied against the surfaces and edges of the collar.

WALTER J. BEATTIE.